United States Patent
Shinozaki et al.

(10) Patent No.: US 6,795,615 B2
(45) Date of Patent: Sep. 21, 2004

(54) APPARATUS AND METHOD FOR REDUCING THE VARIANCE OF GRATING SPACING IN AN OPTICAL FIBER

(75) Inventors: Atsushi Shinozaki, Tokyo (JP); Shigehito Yodo, Tokyo (JP); Toshihiko Ota, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 22 days.

(21) Appl. No.: 10/147,287

(22) Filed: May 14, 2002

(65) Prior Publication Data

US 2003/0012523 A1 Jan. 16, 2003

(30) Foreign Application Priority Data

May 16, 2001 (JP) .......................... 2001-146646

(51) Int. Cl.⁷ ................................................ G02B 6/34
(52) U.S. Cl. .............................. 385/37; 385/14; 385/92
(58) Field of Search .......................... 385/37, 129–132, 385/141, 14, 10, 92–94

(56) References Cited

U.S. PATENT DOCUMENTS

| | | | | | |
|---|---|---|---|---|---|
| 4,484,796 | A | * | 11/1984 | Sato et al. | 385/72 |
| 5,399,854 | A | * | 3/1995 | Dunphy et al. | 250/227.17 |
| 5,420,952 | A | * | 5/1995 | Katsura et al. | 385/80 |
| 5,422,971 | A | * | 6/1995 | Honjo et al. | 385/80 |
| 5,694,503 | A | * | 12/1997 | Fleming et al. | 385/37 |
| 6,101,301 | A | * | 8/2000 | Engelberth et al. | 385/37 |
| 6,349,165 | B1 | * | 2/2002 | Lock | 385/136 |
| 6,370,310 | B1 | * | 4/2002 | Jin et al. | 385/136 |
| 2003/0012523 | A1 | * | 1/2003 | Shinozaki et al. | 385/92 |

* cited by examiner

*Primary Examiner*—Brian M. Healy
(74) *Attorney, Agent, or Firm*—Knobbe Martens Olson & Bear LLP (57) ABSTRACT

An optical module for reducing the variance of grating spacing in an optical fiber comprises an optical fiber receiving portion having an optical fiber receiving portion and optical fiber securing portions for receiving and securing the optical fiber to the optical module, respectively. An adhesive agent containing filler and having an excellent water-vapor resistance is applied to the securing portions of the optical module for securing the fiber grating portion of the optical fiber to the optical module.

27 Claims, 5 Drawing Sheets

APPARATUS AND METHOD FOR REDUCING THE VARIANCE OF GRATING SPACING IN AN OPTICAL FIBER

BACKGROUND OF THE INVENTION

1. Field of the Invention

The invention relates to optical gratings. More specifically, the invention relates to reducing the variance of grating spacing in an optical fiber attached to an optical module.

2. Description of the Related Art

Normal optical fibers are uniform along their lengths so that a slice taken from any one point on the fiber would look like a slice taken from any other part of the fiber, neglecting any tiny imperfections. However, the refractive index of portions of the fiber may vary, and, in fact, it is possible to make the refractive index of the core glass vary periodically along the length of a fiber, rising then falling, then rising again. Portions of fibers having periodically varying refractive indexes selectively scatter light passing through the fiber, and are called fiber gratings.

Fiber gratings may be fabricated using an ultraviolet light incident on the glass core of the fiber. The ultraviolet light creates fiber gratings by breaking atomic bonds in the germania-doped silica glass of the fiber core, for example. Typically, an external ultraviolet laser illuminates the fiber through a thin, flat slab of silica with a pattern of fine parallel troughs etched on its bottom, which is typically referred to as a phase mask. In the regions covered by troughs of the phase mask, the ultraviolet light breaks bonds in the glass, changing its refractive index and forming a grating. These variations in the refractive index of the core scatter light by what is called the Bragg effect. Bragg scattering selectively reflects a narrow range of wavelengths. The Bragg reflection wavelength, also referred to herein as the selected wavelength, is determined based both on the grating spacing and the effective refractive index of the core. Light at the Bragg reflection wavelength is reflected from the Bragg grating. Likewise, wavelengths other than the Bragg reflection wavelength are not reflected in phase, so the scattered light waves do not add constructively. The result is a simple line-reflection filter, which reflects the selected wavelength and transmits other wavelengths. In practice, reflection increases strongly over a range of wavelengths, with peak reflection at the selected wavelength. Fiber Bragg gratings can be made to have peak reflection across a narrow band, with nearly square sides. The rest of the light outside the selected band passes through unaffected.

The variation of the reflectivity with the wavelength depends on the nature of the grating. Fine, thin, evenly spaced lines tend to concentrate reflection at a narrow range of wavelengths. Turning up exposures to make a stronger grating will increase reflectivity and broaden the range of reflected wavelengths. Commercial devices using this design select a range of wavelengths as narrow as a few tenths of a nanometer and ranging up to several nanometers wide. The narrow ranges are well matched to the requirements of wave-length division multiplexing where the ability to select specific wavelengths or where pump and signal wavelengths must be combined or separated is important. Other optical devices can do the same thing, but fiber gratings select a narrow range of wavelengths and fit naturally into fiber-optic systems. The wavelength selected by a fiber Bragg grating is typically tuned by changing the refractive index and/or the grating spacing.

In addition, the refractive index is proportional to the temperature of the grating so that when the grating temperature is increased the refractive index also increases. Temperature change also causes thermal expansion or contraction of the optical fiber core, shrinking or stretching the grating period and, therefore, changing the selected wavelength. Changes in the selected wavelength may have a significant impact on the operations of an optical communication system, especially a system that depends on the selection and/or dropping of specific wavelengths by a fiber grating. Therefore, a fiber grating that is stable over time and environmental conditions is desired.

SUMMARY OF THE INVENTION

The present invention addresses the above mentioned problems.

In one embodiment an apparatus comprises an optical fiber, an optical module, and an adhesive agent securing the optical fiber to the optical module. The adhesive agent has a water resistance sufficient to maintain a Bragg scattering wavelength within about 0.1 nm of a starting wavelength when exposed to ambient conditions of 85 degrees C. and 85% relative humidity for at least 1,000 hours.

In another embodiment, an apparatus comprises an optical fiber adhered to an optical module with an adhesive agent, wherein the adhesive agent comprises more than 10 weight percent and less than 80 weight percent filler.

In another embodiment, method of maintaining a Bragg reflection wavelength of an optical fiber comprises adhering the optical fiber to an optical module with an adhesive agent comprising more than 10 weight percent and less than 80 weight percent filler.

In another embodiment, in an optical communication system comprising an optical fiber and an optical module, a method for inhibiting water absorption of an adhesive agent securing the optical fiber to the optical module comprises adding an inorganic filler to the adhesive agent so that the filler comprises 10 to 80 percent by weight of the adhesive agent.

In another embodiment, an apparatus comprises an optical fiber, an optical module comprising an optical fiber receiving portion, and an epoxy comprising talc securing the optical fiber to the optical fiber receiving portion of the optical module.

These and other objects and features of the present invention will become more fully apparent from the following description and appended claims taken in conjunction with the following drawings, where like reference numbers indicate identical or functionally similar elements.

DETAILED DESCRIPTION OF THE PREFERRED EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

To compensate for the temperature dependency of the grating, a temperature-compensating package may be adhered to the grating portion of the optical fiber. In particular, a temperature-compensating material having a negative linear expansion coefficient may be adhered to the fiber grating using a fixing material, such as a low-melting point glass, metallic solder, or adhesive agent. For example, $ZrW_2O_8$, $HfW_2O_8$, and $Zr_{0.5}Hf_{0.5}W_2O_8$ based ceramics, Bate-Eucryptite glass ceramics, and Liquid crystal polymer resin are materials with negative linear expansion coefficients that may be used as part of a temperature-compensating material. Alternatively, a temperature-compensating package may be formed of two different materials having linear expansion coefficients that are different from each other.

However, the methods used to adhere a temperature-compensating package to an optical fiber may introduce other variations from the desired Bragg reflection wavelength. In particular, when a low-melting-point glass or metallic solder is used as the fixing material to secure the fiber grating portion of the optical fiber to the temperature-compensating package, the fixing material will cause a stress on the fiber grating due to shrinkage of the fixing material as it cures. This cure shrinkage causes the fiber grating spacing (or pitch) to change, and thus, the Bragg reflection wavelength moves from its prescribed (or desired) wavelength. In addition, the linear expansion of the adhesive agent may alter the grating spacing as the temperature changes.

Another environmental factor that has not been appreciated previously also contributes to variations in reflection wavelength of the fiber grating. Specifically, when conventional adhesive agents are used as the fixing material for securing the fiber grating portion of the optical fiber to the temperature-compensating package, a moisture-absorption characteristic of such an adhesive agent may reduce the long-term reliability of the bond. In particular, such fixing materials often exhibit a moisture absorption characteristic that leads to long-term degradation and decreased reliability in the adherence of the optical fiber to the temperature-compensating package.

The term "adhesive agent" is intended to mean any compound that forms chemical bonds during a curing process so as to harden and fix objects or surfaces in contact with it. Due to the chemical bonding cure process, adhesive agents are characterized by relatively low shrinkage during curing as compared to fixing agents such as low melting point glass or metal alloy solders that harden by cooling from a molten liquid state to a solid state.

Adhesive agents are typically amorphous viscous fluids comprising organic monomers or polymers that chemically react during the curing process so as to harden into a solid after application to the desired surfaces. A wide variety of such adhesive agents are known in the art, including acrylics, cross-linked elastomers, epoxies, and many others. Epoxy adhesive agents are in widespread use and have been found particularly suitable for use with the present invention. When cured, this class of adhesives comprises a complex network of ether bonds. Two-part epoxy adhesives typically include a resin comprising monomers having an epoxide ring which is mixed with a curing agent including amines or anhydrides. These two components react to form the polymeric bonds during the curing process. Epoxy agents may include, for example, OPTOCAST 3400, a product of Electronic Materials Inc, WORLD ROCK 8774, a product of Kyoritsu Chemical &Co., LTD., and EPO-TEK 353ND, a product of Epoxy Technology, Inc.

The long-term effect of using conventional adhesive agents to secure the fiber grating portion of an optical fiber to a temperature-compensating package has been tested in the laboratory. In one experiment, for example, a temperature-compensating package adhered to an optical fiber with a conventional adhesive agent was placed in an atmosphere having a temperature of 85° C. and a humidity of 85% for 1,000 hours. The test results showed that as the optical module was left in the high heat and humidity conditions for longer periods, the stress to the optical fiber was weakened and, thus, the Bragg reflection wavelength of the grating portion of the optical fiber was decreased. The final difference in the Bragg reflection wavelength before and after the 1,000 hour test was approximately 0.3 nm.

Accordingly, one aspect of the invention is to provide an optical module that maintains the Bragg reflection wavelength of a fiber grating for an extended period of time. In one embodiment, an optical module is adhered to the fiber grating using an adhesive agent that has minimized cure shrinkage and low moisture absorption properties. These aspects of the invention will now be discussed in detail.

Figure 1:
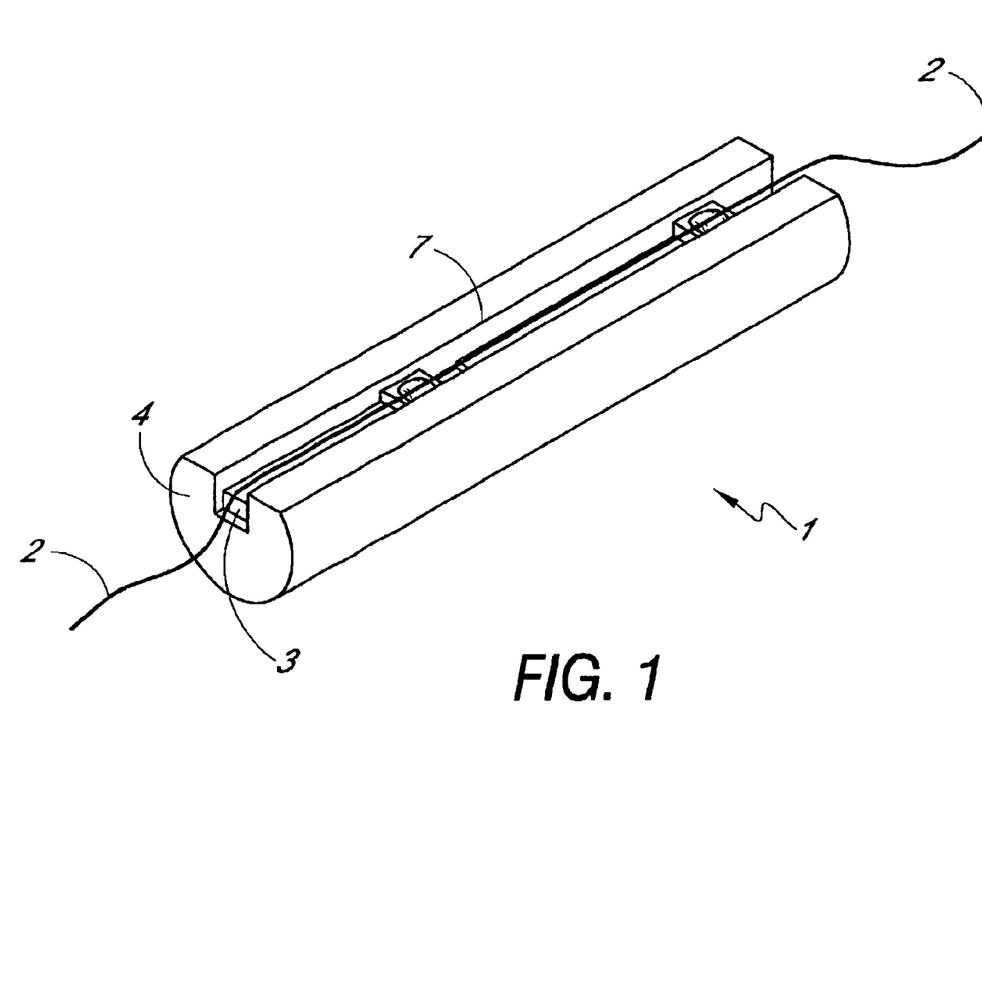
FIG. 1 illustrates a perspective view of an optical module having a groove and an optical fiber placed therein.

FIG. 1 illustrates a perspective view of one embodiment of the optical module 1 having a groove 7 and a optical fiber 2 placed therein. As illustrated in FIG. 1, the cross-section of the optical module 1 may be shaped in a semi-circle with a groove 7. Groove 7, which is a recess located in the central portion of optical module 1, is formed along the length of the optical module 1. A first member 3 is also shown inside the groove 7. In one embodiment, the combination of the first member 3 and a second member form a temperature compensating package, which will be discussed below with respect to FIG. 2. The optical fiber 2 is placed in the groove 7 and adhered to the optical module 1 using an adhesive agent.

Figure 2A:
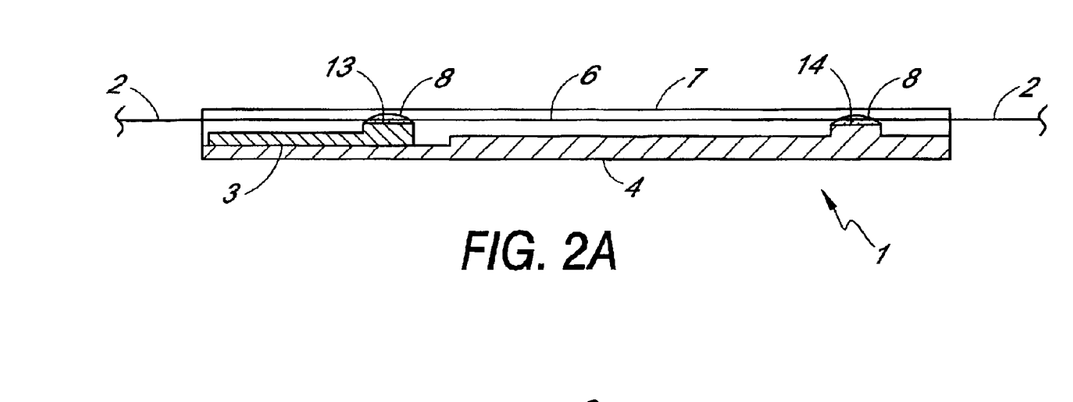
FIG. 2A illustrates a longitudinal cross-sectional view of the optical module.
Figure 2B:
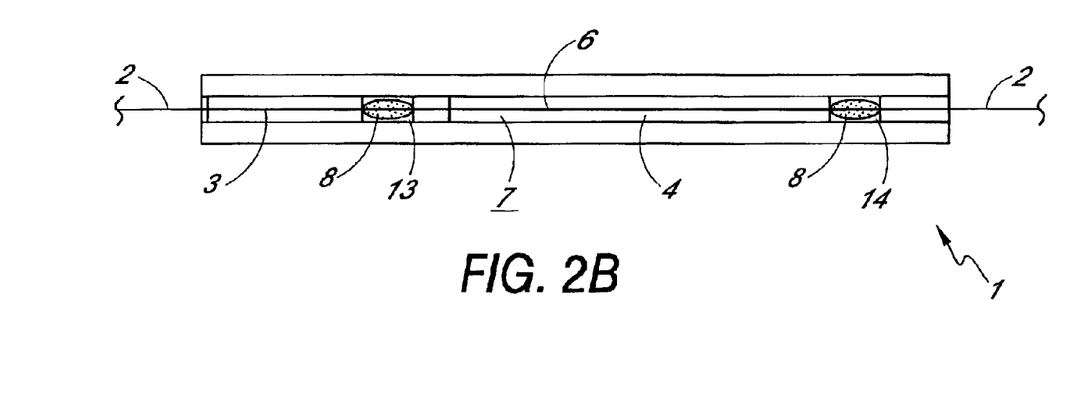
FIG. 2B illustrates a plan view of the optical module.
Figure 2C:
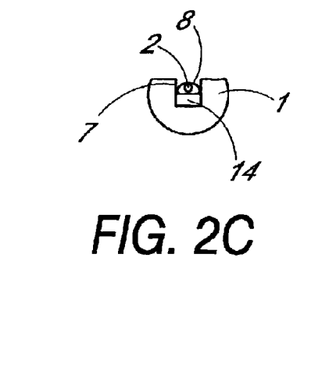
FIG. 2C illustrates an axial cross-sectional view of the optical module.

FIG. 2A illustrates a cross-sectional view of the optical module 1, FIG. 2B illustrates a plan view of the optical module 1, and FIG. 2C illustrates a cross-sectional view of the optical module 1. In the embodiment illustrated in FIG. 2, the difference between the refractive index of the core and that of the clad in the optical fiber 2 is larger than that for a single-mode optical fiber. However, the embodiments discussed herein are applicable to cores having any other refractive index.

As shown in FIGS. 2A and 2B, the optical module 1 comprises a first member 3 and a second member 4. FIG. 2A illustrates a first member 3 that is movably placed on the second member 4. More specifically, the first member 3 and second member 4 are connected so that each member 3 and 4 may expand at different rates. In one embodiment, the first member 3 comprises aluminum having a linear expansion coefficient of about $2.27 \times 10^{-5}/°$ C., while the second member 4 comprises an INVAR material (INVAR (36FN)) having a linear expansion coefficient of about $1.6 \times 10^{-6}/°$ C. Accordingly, the first member 3 has a larger linear expansion coefficient than the optical fiber 2, and the second member 4 has a lower linear expansion coefficient than both the first member 3 and the optical fiber 2. In another embodiment, the particular materials used for the first member 3 and the second member 4 are not limited to the particular materials recited above, but may be any materials that have a similar relationship of linear expansion coefficients as mentioned above. In another embodiment, members 3 and 4 may comprise materials having negative linear expansion coefficients, such as glass or ceramics. In any case, members 3 and 4 apply stress to the grating portion of the optical fiber so that as the temperature increases, the expansion of the fiber will be minimized due to the stress applied by the optical module 1.

The optical fiber 2 includes a grating portion 6 which is fabricated to reflect a specific wavelength of light. The optical module 1 includes a securing portion 13 integrally built on the first member 3 and a securing portion 14 integrally built on the second member 4, which are the contact points where the optical fiber 2 is adhered to the optical module 1. In order to secure the optical fiber to the optical module 1, the optical fiber is typically placed on a tension-applying jig. The optical fiber 2 is then adhered to the securing portions 13 and 14 of members 3 and 4, respectively, of the optical module 1 with an adhesive agent 8. Thus, after the optical module 1 is adhered to the optical fiber 2, the tensile tension that was applied to the optical fiber by the tension-applying jig remains on the grating portion 6 of the optical fiber 2. As such, the Bragg reflection wavelength of the fiber grating will remain constant as the optical module maintains the pitch of the optical gratings in the optical fiber 2. When the temperature increases, the optical fiber 2 tends to increase in its longitudinal direction. However, because the optical module 1 is adhered to the optical fiber 2, as the temperature increases the optical module 1 applies a stress to the optical fiber 2 which opposes the expansion of optical fiber 2. Therefore, the pitch of the fiber gratings and the Bragg reflection wavelength of the optical grating can be substantially maintained.

In order to avoid cure shrinkage of the adhesive agent and grating pitch variations due to absorption of moisture, an adhesive agent 8 comprising a filler is used to adhere the optical module 1 to the optical fiber 2. The term "filler" is intended to mean any substance present in the adhesive that does not substantially participate in the chemical bonds formed during the cure process of the adhesive. The filler is thus present mainly for its ability to impart physical or chemical characteristics to the adhesive other than those related to the adhesive's bonding properties. In many advantageous embodiments of the invention, the filler includes inorganic compounds, where "inorganic" is intended to mean compounds containing no carbon-carbon bonds. Most inorganic compounds contain no carbon at all, but some carbon containing compounds such as carbonates and cyanides are also considered inorganic. Inorganic compounds have been found especially suitable for inhibiting the absorption of water into the cured adhesive.

The adhesive agent 8 comprising filler prevents water absorption by the adhesive agent, and thus decreases the rate at which the tensile stress that was applied to the optical fiber 2 when it was originally adhered to the optical module 1 is reduced over time. As such, the addition of filler 2 to the adhesive agent provides one means for inhibiting water absorption into the adhesive agent. Therefore, the rate of change of the Bragg reflection wavelength over time will also be minimized.

In addition, an adhesive agent 8 that provides a high adhesive strength, such as an epoxy adhesive agent 8, and contains a filler may be used to secure the optical module 1 to the optical fiber 2.

Figure 3:
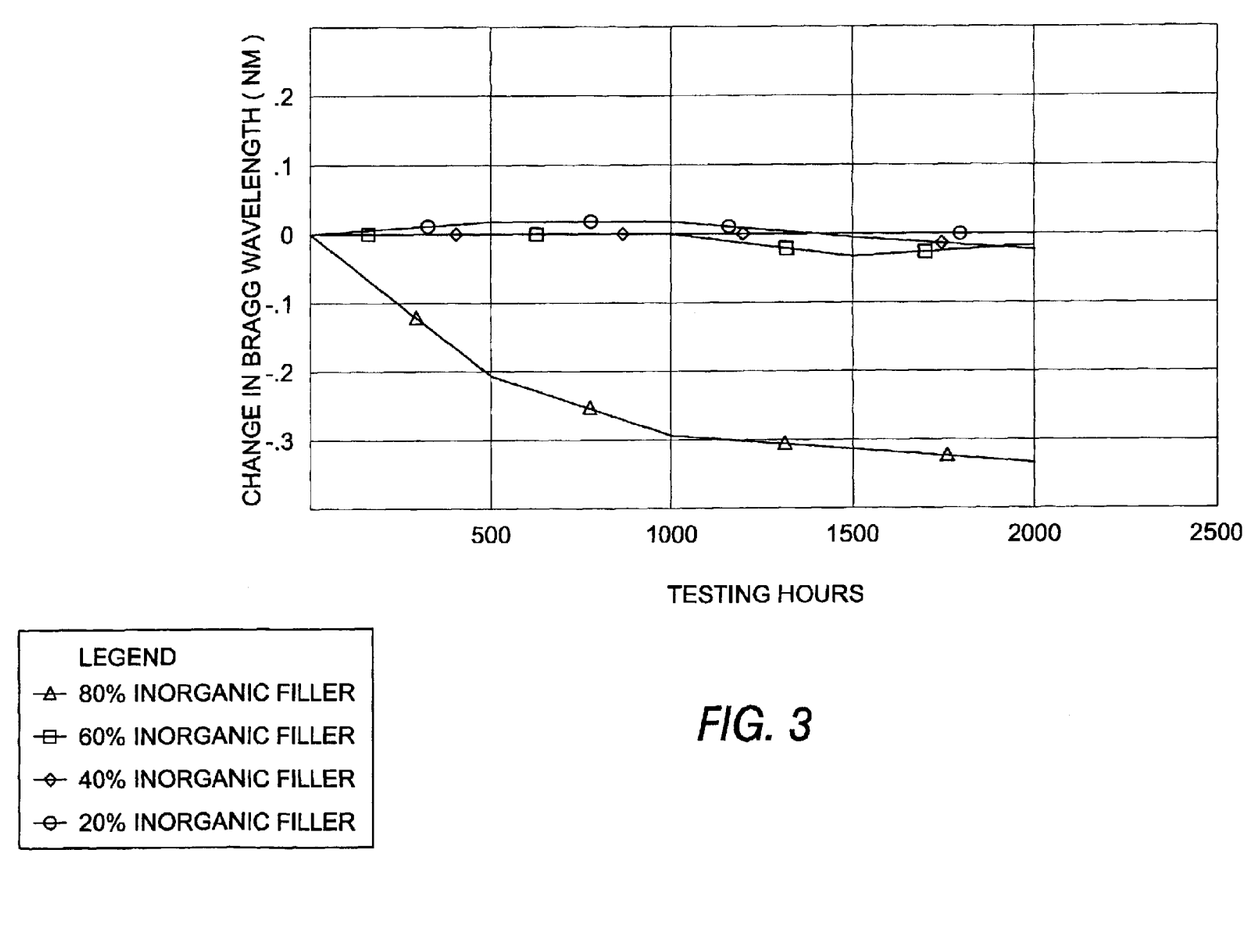
FIG. 3 is a graph illustrating the results of water-vapor resistance tests of three substantially identical optical modules secured to optical fibers with adhesive agents comprising different proportions of inorganic materials.

The use of an adhesive agent 8 comprising various proportions of filler has been tested in a laboratory. FIG. 3 is a graph illustrating the results of water-vapor resistance tests of three substantially identical optical modules 1 secured to optical fibers 2 with adhesive agents 8 comprising different proportions of filler. As illustrated in FIG. 3, three different adhesive agents comprising different proportions of scale-shaped talc (an inorganic filler) were used to adhere an optical module 1 to respective optical fibers, and then subjected to a temperature of 85° C. and a humidity of 85% for 2000 hours, with the change in the Bragg reflection wavelength being measured every 500 hours. The vertical axis of FIG. 3 represents the change in the Bragg reflection wavelength and the horizontal axis represents the exposure time. As shown in FIG. 3, the three adhesive agents using 20%, 40%, and 60% filler result in 0.02 nm or less variance in the Bragg reflection wavelength over the 2000 hour test. Conversely, the Bragg reflection wavelength of the grating adhered using an adhesive agent with 80% filler was changed by more than 0.3 nm after the 2000 hour test. As mentioned above, in a separate test an adhesive agent with 10% filler was tested under the same conditions. After only 1000 hours of exposure to a temperature of 85° C. and a humidity of 85% the Bragg reflection wavelength was changed by about 0.3 nm. Thus, in an one embodiment, the amount of filler in the adhesive agent 8 is more than 10 weight percent and less than 80 weight percent. In another embodiment, the amount of filler in the adhesive agent 8 is between about 20 weight percent and 60 weight percent.

Figure 4:
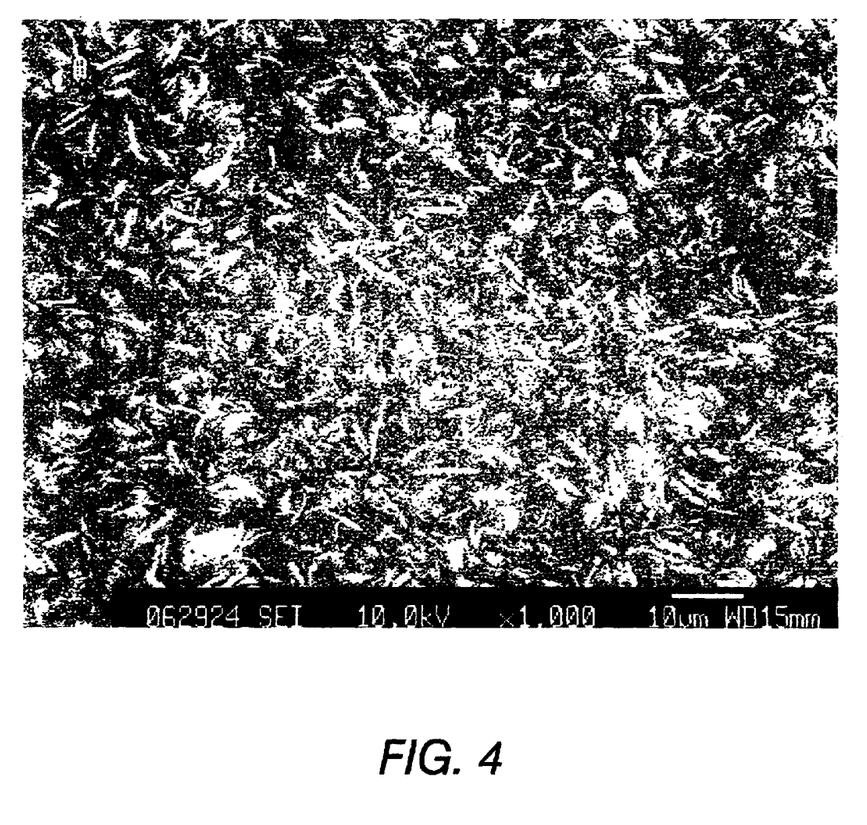
FIG. 4 is an image of scale shaped flakes.

In one embodiment, the filler portion of the adhesive agent 8 comprises 20% by weight of talc ($Mg_3Si_4O_{10}(OH)_2$) shaped into scale shaped flakes. For example, FIG. 4 is a scanning electron microscope image of scale shaped talc flakes which have been found suitable as a filler in some advantageous embodiments. As shown in FIG. 4, the flakes have a wide variance of lengths and are generally elongated. In another embodiment, the filler portion of the adhesive agent 8 comprises silica. However, one of skill in the art will realize that other various chemical compounds, in other proportions, may be used as the filler of the adhesive agent 8, so long as the filler is able to improve the water vapor resistance of the adhesive agent. In addition to increasing the resistance of the adhesive agent 8 to water-vapor, the use of a filler in the adhesive agent 8 also reduces the linear expansion coefficient of the adhesive agent 8 so that cure shrinkage is minimized. In this way, the stress applied to the optical fiber 1 when it is initially adhered to the optical module 2 is not significantly decreased by cure shrinkage.

It may be noted that adding a material having a negative thermal expansion coefficient to an adhesive agent in order to lower the thermal expansion coefficient of the adhesive agent has been suggested in U.S. Pat. No. 5,694,503, titled "ARTICLE COMPRISING A TEMPERATURE COMPENSATED OPTICAL FIBER REFRACTIVE INDEX GRATING" to Fleming et al., which is hereby incorporated by reference for all purposes. However, the materials used as filler and the amounts added to adhesive agents should be selected carefully for their water resistive effects as well. This aspect of the adhesive bond has not been previously appreciated.

Figure 5A:
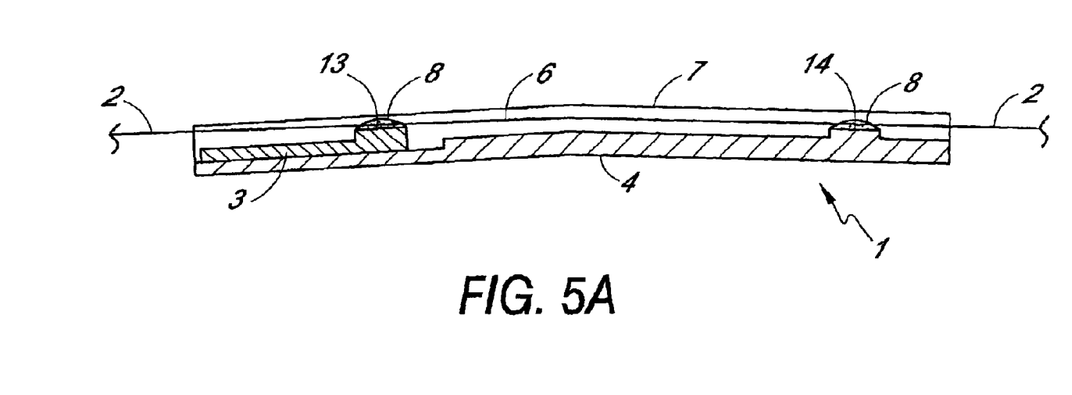
FIG. 5A illustrates a longitudinal cross-sectional view of the optical module according to a second embodiment.
Figure 5B:
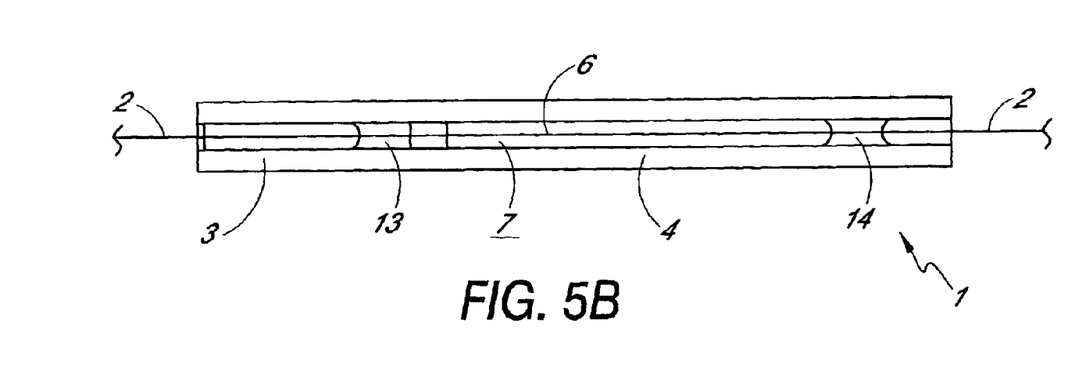
FIG. 5B illustrates a plan view of the optical module according to a second embodiment.
Figure 5C:
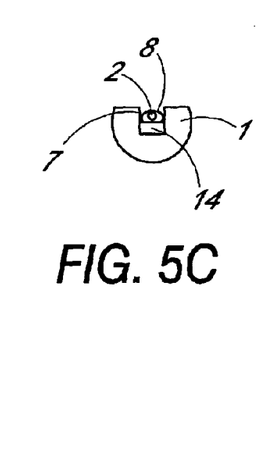
FIG. 5C illustrates an axial cross-sectional view of the optical module according to a second embodiment.

FIGS. 5A–5C illustrate an optical module 1 with a fiber Bragg grating according to another advantageous embodiment of the invention. In this embodiment, after the optical fiber 2 is adhered to the optical module 1, the optical module is deformed so that the pitch of the Bragg fiber gratings is changed. In one particular embodiment, the optical module is deformed by applying a stress perpendicularly to at least one of the members 3 and 4. This stress alters the spacing of the gratings in the grating portion 6 of the optical fiber 1 and adjusts the Bragg reflection wavelength of the fiber grating portion 6. Thus, in one embodiment, the applied stress bends the optical module to have a non-linear longitudinal axis. The act of deforming the optical module 1 thus adjusts a Bragg reflection wavelength of the optical fiber. It will be appreciated that the described method of adjusting a Bragg reflection wavelength may be applied to an optical module comprising an optical fiber adhered to a single member. It will also be appreciated that the optical module 1 may be deformed in other ways, such as, by twisting, compressing, or stretching, for example.

In one embodiment, an optical signal in the optical fiber 1 is monitored by an optical spectrum analyzer at several locations while the stress is applied. For example, in one embodiment an optical spectrum analyzer monitors the power level of one or more specific wavelengths of light. In this way, the changes in Bragg reflection wavelength may be monitored by an optical spectrum analyzer, for example, as the stress is applied so that the Bragg reflection wavelength may be fine tuned.

With specific reference to the optical module 1 illustrated in FIG. 5A a refractive index of the core and clad of the optical fiber 2 varies by about 0.35%. The optical module 1 illustrated in FIG. 5A comprise a deformed second member 4, which was deformed by applying a perpendicular stress to the second member 4 after adhering the optical module 1 to the optical fiber 2. The second member 4 is deformed in an amount that adjusts the Bragg reflection wavelength of the fiber grating of the optical fiber 2 to the prescribed wavelength. Through the use of this deformation technique, the Bragg reflection wavelength may be adjusted to be within 0.01 nm of the prescribed wavelength.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of making an optical component comprising an optical fiber defining a Bragg reflection wavelength so as to substantially maintain said Bragg reflection wavelength during use of said optical fiber, said method comprising:

adhering said optical fiber to an optical module with an adhesive agent comprising more than 10 weight percent and less than 80 weight percent filler, said filler comprising scale shaped flakes.

2. The method of claim 1, wherein said filler comprises an inorganic compound.

3. The method of claim 1, wherein said filler comprises talc.

4. The method of claim 1, wherein said filler comprises silica.

5. A method of making an optical module comprising:

adhering an optical fiber to a temperature compensating package configured to minimize a longitudinal expansion of said optical fiber, wherein said adhering is performed with an adhesive agent comprising more than 10 weight percent and less than 80 weight percent filler.

6. The method of claim 5, wherein said temperature compensating package comprises a first member and a second member, wherein said first and second members comprise different materials and have different linear expansion coefficients.

7. An apparatus comprising:

an optical fiber;

an optical module; and an adhesive agent securing said optical fiber to said optical module, said adhesive agent having water resistance sufficient to maintain a Bragg scattering wavelength within about 0.1 nm of a starting wavelength when exposed to ambient conditions of 85 degrees C. and 85% relative humidity for at least 1,000 hours.

8. An apparatus comprising:

an optical fiber comprising a fiber grating;

a package in which said optical fiber is received; and an adhesive agent securing said optical fiber to said package, said adhesive agent comprising more than 10 weight percent and less than 80 weight percent of a filler comprising scale shaped flakes that imparts water-vapor resistance to said adhesive agent.

9. The apparatus of claim 8, wherein the adhesive agent contains said filler from about 20 to 60 percent by weight.

10. The apparatus of either claim 8, wherein the filler comprises an inorganic compound.

11. The apparatus of claim 8, wherein the filler comprises talc.

12. The apparatus of claim 8, wherein the filler comprises silica.

13. The apparatus of claim 9, wherein the adhesive agent is composed of an epoxy adhesive agent.

14. An optical module comprising:

an optical fiber forming a fiber grating; and a package having both an optical fiber receiving portion in which the optical fiber is received and optical fiber securing portions to which the optical fiber is secured, wherein said optical fiber is secured to the optical fiber securing portions of said package with use of an adhesive agent comprising more than 10 weight percent and less than 80 weight percent of an inorganic filler that imparts water-vapor resistance to said adhesive agent.

15. The optical module of claim 14, wherein said package comprises a temperature-compensating package for compensating a temperature dependency of the fiber grating.

16. The optical module of claim 15, wherein said temperature-compensating package comprises a first member and a second member both of which comprise different materials and have different linear expansion coefficients.

17. The optical module of claim 15, wherein the first member is larger in the linear expansion coefficient than the optical fiber and the second member is smaller in the linear expansion coefficient than both of the optical fiber and the first member.

18. The optical module of claim 15, wherein the temperature-compensation package comprises a material having a negative linear expansion coefficient.

19. The optical module of claim 14, wherein the package is formed into an approximate semicircle in a cross section thereof, cross section of the optical fiber receiving portion is shaped into an approximately rectangular recessed portion, and the optical fiber securing portions are formed on the bottom of said recessed portion.

20. The optical module of claim 14, wherein the optical fiber is secured to the optical fiber securing portions of the package in a state where a Bragg reflection wavelength of the fiber grating is substantially equal to a predetermined wavelength.

21. The optical module of claim 20, wherein the optical fiber has a core and a clad coating an outer surface of the core, and a difference of a specific refractive index of the core to a specific refractive index of the clad is determined so as to be larger than said difference for a single-mode optical fiber.

22. The optical module claim 14, wherein the adhesive agent contains the filler from about 20 to 60 weight percent.

23. The optical module of claim 22, wherein the filler comprises talc.

24. The optical module of claim 22, wherein the filler comprises silica.

25. The optical module of claim 23, wherein the filler is formed into scale shaped flakes.

26. A method of setting a Bragg reflection wavelength of an optical fiber adhered to an optical module, said optical module comprising a first receiving portion a second receiving portion, the method comprising:

adhering said optical fiber to said first and second receiving portions with an adhesive agent comprising more than 10 weight percent and less than 80 weight percent of an inorganic filler, wherein a fiber grating portion of said optical fiber is disposed between said first and second receiving portions; and deforming said optical module.

27. The method of claim 26, wherein said act of deforming comprises bending said optical module.

* * * * *